Patented Mar. 4, 1930

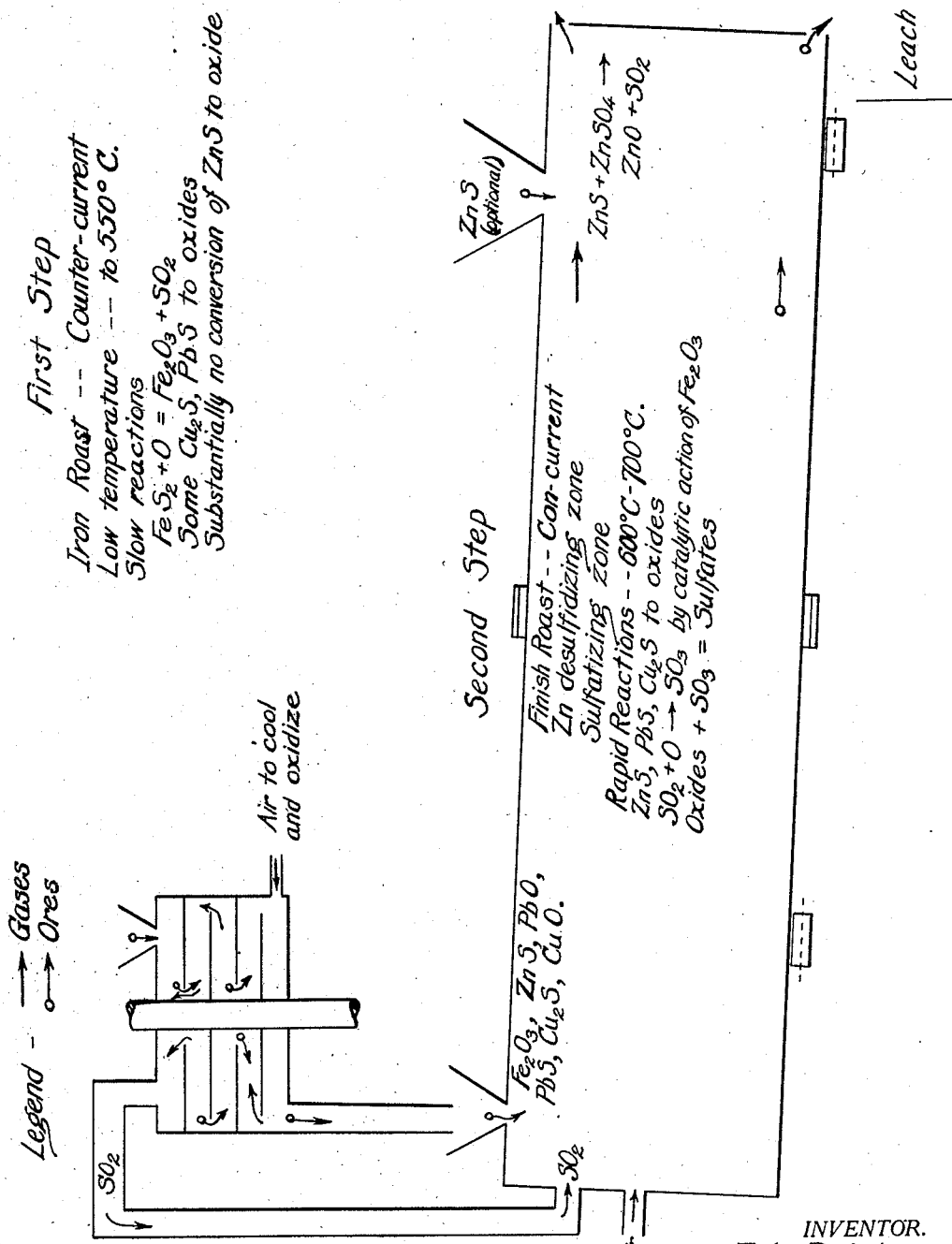

1,749,125

UNITED STATES PATENT OFFICE

FREDERIC A. BRINKER, OF SAN FRANCISCO, CALIFORNIA, ASSIGNOR OF ONE-FOURTH TO JOSEPH P. RUTH, JR., OF DENVER, COLORADO

TWO-STEP SULPHATIZING ROAST

Application filed October 21, 1926. Serial No. 143,126.

This process relates to the formation of metallic sulphates from complex ores and the like, and relies upon the fact that ferric oxide constitutes a catalyst for the oxidation of sulfur dioxide to sulfur trioxide which latter combines with oxides to form sulphates.

The object of the invention is to provide a sulphatizing process which will insure higher extraction than heretofore, will more freely sulphatize the various metals according to their individual characteristics, will form smaller amounts of ferrites and thereby simplify and increase extraction, and will be generally more economical as to fuel and the like. It is also an object to provide a sulphatizing roast wherein the reactions may, if desired, be carried beyond the sulphatizing point and yield a zinc oxide calcine which may be treated in an acid leaching process to yield a more desirable calcine from a metallurgical and economical standpoint.

The process is designed to fit the chemical laws which govern the reactions of the different materials and to care for the wide difference in ignition temperatures, formation temperatures, intensities and like conditions of the various constituents of various ores, having in mind whether the reactions are gas to gas, gas to solid, or solid to solid. The process is applicable to all sulfide ores and concentrates containing zinc, lead, copper or other metals or mixtures thereof, in which iron sulfide is present or to which it may be added.

Essentially, the process is a two-step roast, the first step being a counter-current iron roast (minerals and gases moving oppositely) for desulfidizing the iron sulfide to form catalytic ferric oxide ($Fe_2O_3$), the second step being a con-current finishing roast (gases and minerals moving in the same direction) for desulfidizing zinc sulfide and for the catalytic oxidation of sulfur dioxide ($SO_2$) to sulfur trioxide ($SO_3$) and the formation of sulphates by the action of the $SO_3$ thus obtained. Sulfides of other metals such as lead and copper are desulfidized in both steps. The basis for the roast in these two steps is the wide difference between the conditions necessary to desulfidize the iron and condition the iron oxide to that form best suited for catalysis of the sulfur dioxide, and the conditions necessary to desulfidize and sulphatize the zinc. Thus, the temperature in the first step must be low enough to produce ferric oxide of proper condition which is too low to desulfidize the zinc and to form zinc ferrite and should be too low to form copper ferrite if copper is present. And the temperatures for the second step must be high enough to desulfidize the zinc sulfide and suitable for the catalysis of sulfur dioxide to sulfur trioxide and for the formation of sulphates. The process may terminate with the sulphatizing roast or it may be extended to include, for example, the formation of a zinc oxide calcine by the addition of zinc sulfide to the zinc sulphate formed to convert all or a portion of the zinc sulphate along with the sulfide into such zinc oxide calcine. The invention resides also in all the various novel features, steps and combinations thereof as herein presented and described.

In the accompanying drawings there is represented diagrammatically one desirable type of apparatus and a method for carrying on the invention, the manner of advancing the gases and solids and the primary reactions and conditions being indicated.

First step—counter-current roast

The first step is conveniently carried on in a vertical hearth furnace wherein the sulfide ore is fed at the top and discharged from the bottom, while air is admitted to the lower portion of the furnace and travels upward in counter-current to the ore. Here the chief function is to roast the iron sulfide to ferric oxide ($Fe_2O_3$) of the best form for the subsequent catalytic oxidation of $SO_2$ to $SO_3$, since that is the link which connects the $SO_2$ liberated in the first step with the sulphates formed in the second step. To properly roast the sulfide and maintain this condition, it is necessary to keep the temperature low and allow the reaction to proceed slowly. The temperature is therefore kept down to about 550° C. and this is controlled by the admission of cold air to the last or the next to the last hearth. The air so admitted provides a cooling effect where it is most needed and serves as a means for controlling the intensity of oxidation on the upper hearths by supplying a deficiency of oxygen thereto. Also this air supply places the most oxygen where it is needed to produce the best conditioned ferric oxide, that is, on the lower hearths.

These conditions desulfidize all of the iron sulfide and some of the lead and copper sulfides, but very little if any of the zinc sulfide. These conditions also avoid the formation of appreciable amounts of zinc ferrite, $ZnO.Fe_2O_3$. Whereas, if this were a concurrent roast, the intensity would build up and the temperature become so high that the iron oxide would be poorly conditioned and subsequent catalysis would be poor. Also some of the zinc would oxidize in a concurrent roast and react with the ferric oxide to form the insoluble ferrite which is hard to break later in the roast and also causes a very low yield of sulfur trioxide. But in the counter-current low-temperature iron roast no zinc oxide will form and therefore no zinc ferrite.

The principal reactions in this step are:

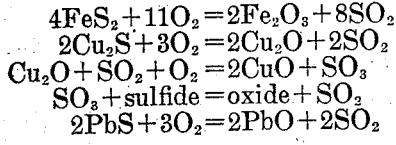

Second step—concurrent finishing roast

The finishing roast is indicated as being performed in a tube furnace in which the gas-to-solid reaction of this step will take place very readily. The calcine from the iron roast, containing the catalytic ferric oxide, zinc sulfide, and lead and copper sulfides and oxides and the like, is discharged into the upper end of the tube furnace, while the sulfur dioxide and other gases from the iron roast, together with the required amount of air, are also introduced into the upper end of said tube furnace and caused to move concurrently with the mineral. The reaction here is highly oxidizing, and if the ferric oxide has been properly conditioned in the iron roast the reaction is dependent only upon contact between the gases and solids. The temperature may vary between 600° C. and 700° C., and the reactions proceed very rapidly. The zinc sulfide and other remaining sulfides are oxidized. Under the catalytic influence of the $Fe_2O_3$, the $SO_2$ is quickly oxidized to $SO_3$ which in turn reacts with all of the metal oxides to form sulphates. Zinc ferrite will not be formed for two reasons: first, because the reaction $ZnO+Fe_2O_3=ZnO.Fe_2O_3$ is a solid-to-solid reaction for which there is not proper contact in this type of roast; second, because the zinc oxide will also be in contact with $SO_3$ which will reverse the reaction to the point that the amount of ferrite formed will be negligible.

The principal reactions taking place in this step are:

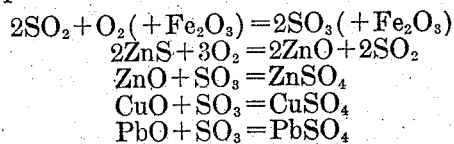

The flue dust, which comprises a small part of the total calcine and is settled out of the flue gases, is a roasted calcine ready for leaching. This is an advantage as it therefore is not necessary to return the dust to the furnace for re-roasting.

Zinc oxide calcine

If zinc sulphate is to be formed only as an intermediate product, or only a limited amount thereof is desired, and zinc oxide calcine is desired in the final product, raw zinc sulfide may be introduced near the end of the furnace and will give the well known reaction

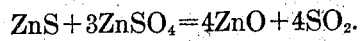

This is an endothermic reaction which will not result in overheating any of the particles and will not cause lowering of the extraction already made. Instead, the same high extraction can be obtained, and there will be a tendency to increase the tonnage which can be roasted per furnace. The product thus obtained is a final calcine ready for leaching with acid.

In general

The process is equally applicable to any ore or product in which iron sulfide is present or to which it may be added, the desulfidizing roast serving to form and condition the ferric oxide and the second roast serving to sulphatize all or a part of the metallic contents. The process is particularly suitable to ores high in copper, because heretofore large amounts of copper ferrite have been formed by the processes employed; whereas by this process the formation of copper ferrite may be held to a very low point merely by lowering the temperature in both steps and thereby holding down the intensities until most of the sulfur has been driven off, whereupon the temperature may be increased and sulphatization allowed to proceed at the desired rate.

The air introduced into the process may be either cold or preheated, and all the air necessary for both roasting steps may be added in the iron roast if combustion does not proceed too freely; otherwise or if preferred the required amounts of air will be supplied to the respective roasts.

I claim:

1. A process for sulphatizing ores containing iron and other sulfides comprising two steps in the first of which the minerals are moved in contact with the liberated gases at a temperature sufficient for conversion of the iron sulfide and at least portions of other sulfides but too low for the conversion of material amounts of zinc sulfide, and in the second of which the minerals from the first step move concurrently with the gases from the first step and are sulphatized.

2. A two-step roasting process for sulphatizing ores containing iron and zinc sulfides comprising moving the minerals counter-current to the liberated gases in the first step and desulfidizing the iron sulfide without desulfidizing the zinc sulfide, and moving the calcine and gases from the first step concurrently in the second step whereby the minerals are sulphatized.

3. A roasting process for sulphatizing ores containing iron sulfide and other minerals comprising two steps in the first of which the iron sulfide is oxidized to a catalytic ferric oxide at a temperature too low for the conversion of material amounts of zinc sulfide, and wherein the minerals move counter-current to the liberated gases, and in the second of which the minerals and gases from the first step move concurrently and the sulfur dioxide is converted to sulfur trioxide and the minerals sulphatized thereby.

4. A roasting process for sulphatizing ores containing iron sulfide and other minerals comprising two steps in the first of which the minerals move counter-currently to the liberated gases and the iron sulfide is oxidized and in which the temperature is maintained too low for the conversion of material amounts of zinc sulfide, and in the second of which steps the minerals and gases from the first step are moved concurrently for the oxidation of $SO_2$ to $SO_3$ and in which the temperature is carried high enough for the desulfidizing of zinc sulfide and sulphatizing of the roasted minerals takes place.

5. A roasting process for sulphatizing ores containing iron sulfide and zinc sulfide comprising two steps in the first of which the minerals are moved counter-currently to the liberated gases and at a temperature low enough for the formation of large amounts of catalytic ferric oxide and too low for the conversion of appreciable amounts of zinc sulfide, and in the second step the minerals and gases from the first step are moved concurrently for the catalytic conversion of sulfur dioxide to sulfur trioxide and at a temperature high enough for oxidation of the zinc sulfide and wherein the minerals are sulphatized by action of the $SO_3$.

6. A roasting process for sulphatizing ores containing iron, copper and zinc sulfides comprising two steps in the first of which the minerals are moved counter-currently to the liberated gases at a temperature low enough to insure the formation of large amounts of catalytic ferric oxide and too low for the formation of copper ferrite and conversion of appreciable amounts of zinc sulfide, and in the second step the minerals and gases from the first step are moved concurrently initially at a low enough temperature for the conversion of any remaining copper sulfide without the formation of copper ferrite and then at a high enough temperature for the conversion of the zinc sulfide and wherein sulfur dioxide is oxidized to sulfur trioxide and the minerals are sulphatized thereby.

7. A roasting process for sulphatizing ores containing iron and zinc sulfides comprising two steps in the first of which the minerals move counter-currently to the liberated gases and the iron sulfide is oxidized and in which the temperature is maintained below approximately 550° C., and in the second of which steps the minerals and gases from the first step are moved concurrently for the oxidation of sulfur dioxide to sulfur trioxide and in which the temperature is carried above 600° C.

8. A two-step roasting process for sulphatizing ores containing iron and zinc sulfides comprising moving the minerals counter-current to the liberated gases in the first step and desulfidizing the iron sulfide without desulfidizing the zinc sulfide, moving the calcine and gases from the first step concurrently in the second step whereby the minerals are sulphatized, and introducing zinc sulfide at the end of this second step for reaction with the newly formed zinc sulfate to produce a calcined zinc oxide.

9. A roasting process for sulphatizing ores containing iron sulfide and zinc sulfide comprising two steps in the first of which a temperature is maintained low enough for the formation of large amounts of catalytic ferric oxide and too low for the conversion of appreciable amounts of zinc sulfide, and in the second step the minerals and gases from the first step are moved concurrently for the catalytic conversion of sulphur dioxide to sulphur trioxide and at a temperature high enough for oxidation of the zinc sulfide and wherein the minerals are sulphatized by the action of the $SO_3$.

10. A roasting process for sulphatizing ores containing iron sulfide and zinc sulfide comprising two steps in the first of which a temperature is maintained low enough for the formation of large amounts of catalytic ferric oxide and too low for the conversion of appreciable amounts of zinc sulfide, such temperature control being accomplished by maintaining a deficiency of oxygen, and in the second step the minerals and gases from the first step are moved concurrently for the catalytic conversion of sulphur dioxide to sulphur trioxide and at a temperature high enough for oxidation of the zinc sulfide and wherein the minerals are sulphatized by the action of the $SO_3$.

In testimony whereof I affix my signature.

FREDERIC A. BRINKER.